US008912686B2

(12) United States Patent
Stoner, Jr. et al.

(10) Patent No.: US 8,912,686 B2
(45) Date of Patent: Dec. 16, 2014

(54) WIRELESS POWER SYSTEM AND METHOD WITH IMPROVED ALIGNMENT

(75) Inventors: William T. Stoner, Jr., Ada, MI (US); Colin J. Moore, Lowell, MI (US); Benjamin C. Moes, Wyoming, MI (US); Joshua K. Schwannecke, Grand Rapids, MI (US); David W. Baarman, Fennville, MI (US); Richard J. Weber, Grand Haven, MI (US); Ryan D. Schamper, Grand Haven, MI (US)

(73) Assignee: Access Business Group International LLC, Ada, MI (US)

( * ) Notice: Subject to any disclaimer, the term of this patent is extended or adjusted under 35 U.S.C. 154(b) by 597 days.

(21) Appl. No.: 13/286,428

(22) Filed: Nov. 1, 2011

(65) Prior Publication Data

US 2012/0112553 A1    May 10, 2012

Related U.S. Application Data

(60) Provisional application No. 61/410,105, filed on Nov. 4, 2010.

(51) Int. Cl.
*H01F 38/14* (2006.01)
*H02J 5/00* (2006.01)
*H01F 7/02* (2006.01)

(52) U.S. Cl.
CPC .............. *H02J 5/005* (2013.01); *H01F 7/0247* (2013.01); *H01F 38/14* (2013.01)
USPC .......................................... 307/104; 320/108

(58) Field of Classification Search
None
See application file for complete search history.

(56) References Cited

U.S. PATENT DOCUMENTS

| 5,600,225 | A | 2/1997 | Goto |
| 6,293,509 | B1 * | 9/2001 | Richter ...................... 248/309.4 |
| 7,322,550 | B2 * | 1/2008 | Killion ........................ 248/206.5 |
| 7,518,337 | B2 * | 4/2009 | Beart et al. .................... 320/108 |
| 7,932,798 | B2 | 4/2011 | Tolle et al. |
| 8,385,822 | B2 * | 2/2013 | Chatterjee et al. ............ 455/41.1 |
| 8,544,830 | B2 * | 10/2013 | Sladojevic ......................... 269/8 |
| 2009/0096413 | A1 | 4/2009 | Partovi et al. |
| 2010/0050845 | A1 * | 3/2010 | Ipatenco .................... 83/698.21 |
| 2011/0062914 | A1 | 3/2011 | Park et al. |

OTHER PUBLICATIONS

PCT International Search Report for International Application No. PCT/US2011/058776, dated Nov. 19, 2012.
PCT International Preliminary Report on Patentability for International Application No. PCT/US2011/058776, dated May 8, 2013.

* cited by examiner

*Primary Examiner* — Jared Fureman
*Assistant Examiner* — David Shiao
(74) *Attorney, Agent, or Firm* — Warner Norcross & Judd LLP

(57) ABSTRACT

A wireless power system that may align a portable electronic device with an inductive wireless power supply. The induction coils used for transferring power wirelessly may be used as DC electromagnets to align the portable electronic device with the inductive wireless power supply. A DC current may be supplied to the primary coil and to the secondary coil to generate DC electromagnetic fields and attractive force between the primary and secondary coils. This attractive force may be used for alignment.

25 Claims, 10 Drawing Sheets

WIRELESS POWER SYSTEM AND METHOD WITH IMPROVED ALIGNMENT

BACKGROUND OF THE INVENTION

The present invention relates to systems and methods for aligning a portable device with an inductive wireless power supply, and more particularly to such systems that use magnetic attraction to align a portable device on an induction charging surface.

Inductive wireless power supply systems include an inductive power supply with a primary coil and a portable device with a secondary coil. The inductive power supply may also include an inductive charging surface for placement of the portable device. In a typical situation involving this configuration, the portable device is placed on the inductive charging surface so that the primary coil and secondary coil are aligned and may inductively couple for wireless power transfer.

In some applications, attempts have been made to place the secondary coil in close alignment and proximity to the primary coil located adjacent to the inductive charging surface. Alignment and proximity may affect the mutual inductance between the primary coil and the secondary coil, which influences the efficiency of the power transfer. As used in the description, the term alignment pertains to the concentricity of the primary coil and secondary coil, and the term proximity relates to the planar spacing between the primary coil and secondary coil.

A user is often unaware of the exact location of the primary or secondary coil within the inductive power supply or portable electronic device. The secondary coil and primary coil may not be exposed so that the user knows their position within the portable electronic device or the inductive wireless power supply. Absent some additional information, the user may find it difficult to achieve consistent alignment between the primary and secondary coils and therefore efficient power transfer. As a result, many conventional systems and methods have attempted to improve the user's ability to provide close alignment of the secondary coil relative to the primary coil.

Some examples of conventional systems and methods for facilitating proper alignment of a primary coil with a secondary coil include geometrically matched surfaces, permanent magnets, magnetic attractors, multiple coil arrays, nested coils, and movable coils. These systems and methods may be designed to create improved mutual inductance between primary coils and secondary coils through close alignment.

An inductive wireless power supply that uses multiple coil arrays may allow the user to place the portable electronic device near the inductive power supply without concern for a specific location or close alignment. The multiple coil arrays may include more than one primary coil located in different areas of the inductive charging surface so that any of the primary coils may be selected to wirelessly power a portable electronic device. Accordingly, the surface area over which a secondary coil may be placed in close alignment with at least one primary coil may be increased, which may free the user from having to know the position of the secondary coil relative to a primary coil. However, multiple coils arrays tend to be expensive to implement, which in many cases makes them an inappropriate solution for achieving close alignment between a primary coil and a secondary coil.

In inductive wireless power supplies that use movable coils, the user may also place the portable electronic device near the inductive wireless power supply without concern for a specific location or close alignment. Accordingly, the inductive wireless power supply of this example also allows for spatial freedom. Movable coil systems in general include a primary coil that may change positions within the inductive power supply to facilitate alignment with a secondary coil. In many applications, actuators or motors may be utilized to move the primary coil based on a sensed location of the secondary coil. As a result of this physical movement used in the movable coil system, components may be prone to mechanical failure.

Nested coils, such as one or more coils nested within another coil, may limit the interoperability of the inductive charger. Specifically, although the nested coil solution may provide some spatial freedom, the inductive charger and portable device may use a specific nest geometry for operating with each other.

In another example, the inductive power supply includes permanent magnets or magnetic attractors to improve alignment between the primary coil and secondary coil. The permanent magnet or magnetic attractor may be associated with the primary coil and secondary coil to produce magnetic force. For example, the primary coil and secondary coil may each have permanent magnets that attract to each other. In another example, either the primary coil or secondary coil may have a permanent magnet used to attract the other coil having a magnetic attractor, which is a slug of ferromagnetic material in the other coil. Accordingly, permanent magnets can be utilized to attract the portable electronic device to the inductive power supply through magnetic force. Using this force, the system may aid the user to align the secondary coil relative to the primary coil.

The use of permanent magnets to achieve alignment and proximity in this example system may not exist without certain limitations. First, permanent magnets may heat up in the presence of an AC magnetic field, causing undesired heat transfer to nearby components. Second, the amount of force used to align the portable electronic device with the inductive power supply may be large. Larger magnetic forces can correlate to larger permanent magnets, and space within the portable electronic device or the inductive power supply may be limited. Permanent magnets also can be expensive. Third, permanent magnets may attract surrounding objects, such as paper clips, which can cause a poor user experience with the inductive wireless power system. A fourth limitation may be the DC magnetic flux produced from the permanent magnets. The inductive performance of a system may be degraded by the presence of permanent magnets in close proximity to the inductive coils and flux guides. Further, the presence of DC magnetic flux can lower the saturation point of magnetic shielding materials. These magnetic shielding materials may be used to guide the AC flux of the inductive charging system, and a lower saturation point means that more AC flux may be lost.

Lastly, balancing characteristics of permanent magnets may include performance trade-offs. For example, magnets that are too weak might not affect alignment or be perceptible to a user. On the other hand, magnets that are too strong may result in the inductive charger being lifted off the table when the portable device is picked up.

SUMMARY OF THE INVENTION

The present invention provides a self-aligning inductive wireless power system and method in which a wireless induction coil and an external DC electromagnetic field may be used to attract the wireless induction coil toward a desired location for more efficient wireless power transfer. More specifically, a direct current or DC current supplied through the wireless induction coil produces a temporary DC magnetic field or static field that interacts with the external DC magnet or ferromagnetic attractor, and results in magnetic force acting on the wireless induction coil. When the temporary DC magnetic field and the external DC magnet have magnetic moments aligned in the same direction, an attractive force may occur on the wireless induction coil. Alternatively, in order to generate an attractive force, an external magnetic field may be produced (1) using a DC current through another wireless induction coil, (2) a magnet, (3) a ferromagnetic attractor, or (4) any combination thereof.

In one embodiment, the self-aligning wireless power system creates a temporary DC magnetic field from two wireless induction coils to attract the two together. In this embodiment, a primary coil may be one wireless induction coil and a secondary coil may be another wireless induction coil, where the primary coil is within an inductive wireless power supply and the secondary coil is within a portable electronic device. The force from each of the temporary DC magnetic fields produced from the primary coil and the secondary coil urges the coils closer into alignment. After time for alignment operation has elapsed, the system may turn off the temporary DC magnetic fields and commence inductive power transfer using an AC magnetic field.

In another embodiment, a temporary DC magnetic field may be produced from one of the primary coil or secondary coil, and a magnet may be associated with the other of the primary or secondary coil. For example, a magnet may be associated with the secondary coil in the electronic portable device. A temporary DC magnetic field may then be generated from the primary coil to produce an attractive force between the primary coil and the magnet associated with the secondary coil. This attractive force may be used to align the primary and secondary coils for efficient power transfer. Alternatively, a magnet may be placed in the inductive power supply and a temporary DC magnetic field produced from the secondary coil to align the electronic portable device.

In another embodiment, a temporary DC magnetic field may be produced from one of the primary coil or secondary coil, and a ferromagnetic attractor may be associated with the other of the primary or secondary coil. For example, a ferromagnetic attractor may be associated with the secondary coil in the electronic portable device. A temporary DC magnetic field may then be generated from the primary coil to produce an attractive force between the primary coil and the ferromagnetic attractor associated with the secondary coil. This attractive force may be used to align the primary and secondary coils for efficient power transfer. Alternatively, a ferromagnetic attractor may be placed in the inductive power supply and a temporary DC magnetic field produced from the secondary coil to align the electronic portable device.

In another embodiment, a magnet may be associated with one of the primary coil or secondary coil, where that coil may be supplied with a DC current to produce a temporary DC magnetic field that is combined with the DC magnetic field produced from the magnet. For example, a magnet and a secondary coil may be located in the electronic portable device. A DC current may be supplied to the secondary coil to produce a DC magnetic field in addition to the field produced by the magnet. The DC magnetic field produced by the magnet may enhance or increase the magnitude of the DC magnetic field from the electronic portable device. Accordingly, when a DC magnetic field is produced from the primary coil, an attractive force may aid the secondary coil and primary coil to achieve improved alignment.

In another embodiment, the attractive force produced by a DC magnetic field from the primary coil, the secondary coil, or both may be used as haptic feedback to a user. As a user places the electronic portable device near the inductive power supply, an attractive force may be generated so that the user can sense a direction of force and move the electronic portable device toward proper alignment with the primary coil of the inductive power supply.

In one aspect, a method for the self-aligning wireless power system includes a process for aligning the primary coil and secondary coil. The wireless power supply system may generate a temporary DC magnetic field from at least one of the inductive power supply or the portable electronic device. The temporary DC magnetic field may be generated by supplying DC current to at least one of the inductive power supply or the portable device. The temporary DC magnetic field may interact with another DC magnetic field to produce an attractive force for aiding alignment of the primary coil and secondary coil.

In one embodiment, a method for the self-aligning wireless power system includes a process for aligning the primary coil and the secondary coil when presence of a portable electronic device is detected. Once presence of a portable electronic device is detected, an alignment procedure may be made to enhance proximity and alignment between the primary coil and the secondary coil. After the alignment procedure occurs or is given time to occur, the system may begin power transfer and monitor to see if alignment can be improved. In one example, the portable electronic device may be moved during power transfer, which may trigger a re-alignment request.

In another embodiment, a method for the self-aligning wireless power system includes determining power transfer efficiency between an inductive power supply and an electronic portable device. If efficiency is low, then the system may make an alignment request and perform an alignment operation. The self-aligning wireless power system may stop transferring power and begin supplying DC current to at least one of a primary inductor or a secondary inductor to cause alignment. After this alignment operation has occurred, the system may resume power transfer.

In another aspect, the self-aligning wireless power system includes an inductive wireless power supply with an array of primary coils. When a portable electronic device is placed on the array, the self-aligning wireless power system may cause the secondary coil in the portable electronic device to align with at least one of the primary coils in the inductive wireless power supply.

In yet another aspect, the wireless power system includes an inductive element for use in wireless power transfer, a frictional material, and a magnet. The frictional material is capable of being in an engaged position such that the ability for a user to move an electronic portable device relative to an inductive power supply is prevented or reduced. Further, the magnet is coupled to the frictional material, where in a presence of a DC magnetic field, the magnet moves the frictional material from a normal state to an alternate state.

The present invention provides a simple and effective wireless power system that aids alignment of a portable device relative to an inductive power supply for improving power transfer efficiency. The wireless power system may utilize a wireless induction coil to produce a temporary DC magnetic field. This may be a cost effective and reliable alignment aid for wireless power systems. Indeed, the existing wireless induction coils, such as the primary, secondary, or both coils, may be used as an alignment aid.

These and other objects, advantages, and features of the invention will be readily understood and appreciated by reference to the detailed description of the current embodiment and the drawings.

DESCRIPTION OF THE CURRENT EMBODIMENTS

Figure 1:
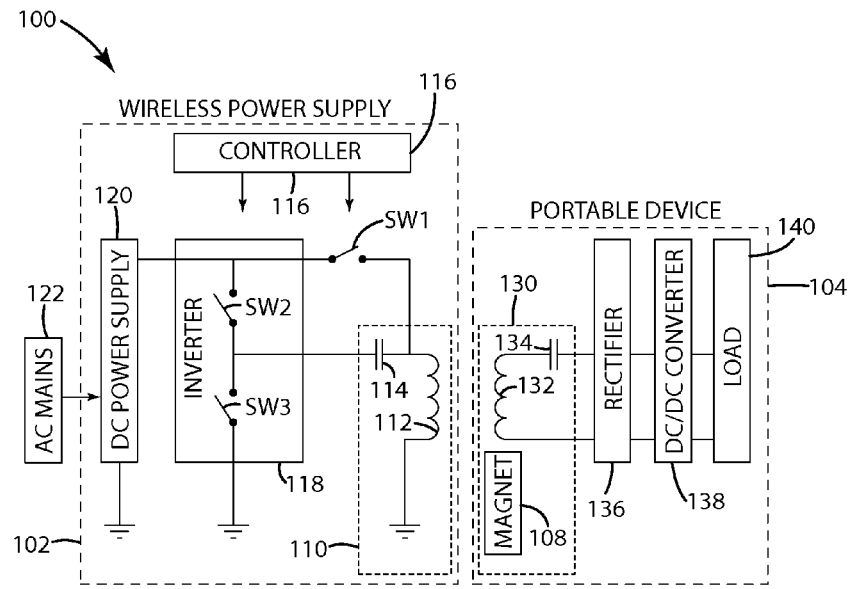
FIG. 1 illustrates a representative schematic of a current embodiment of the DC coil drive system.

A representative schematic of a DC coil drive system 100 for magnetic attraction in accordance with one embodiment of the present invention is shown in FIG. 1. The DC coil drive system 100 includes an inductive power supply 102 and an electronic portable device 104 capable of receiving wireless power. The inductive power supply 102 may include a primary coil 112 and the electronic portable device 104 may include a secondary coil 132. At least one of the primary coil 112 and secondary coil 132 may be used as an alignment aid by supplying it with a DC current. This DC current may cause a temporary DC electromagnetic field to be generated, which may interact with another DC electromagnetic field to cause a mechanical force (e.g. attractive force). This mechanical force may be used to aid alignment of the secondary coil 132 with the primary coil 112 to improve power transfer efficiency.

The inductive power supply 102 may be any type of inductive wireless power supply capable of transmitting power via an electromagnetic field. For purposes of disclosure, the present invention is described in connection with a particular inductive power supply 102 for applying power to a portable electronic device 104. The present invention, is however, well suited for use with other wireless power supply circuitry and may alternatively include essentially any wireless power supply circuitry capable of transmitting power from a primary coil to a secondary coil.

Inductive power supply 102 may include components known in the art and be capable of transmitting energy wirelessly to the electronic portable device 104. In an alternative embodiment, the inductive power supply 102 may provide energy to a variety of electronic portable devices 104. Further, the inductive power supply 102 may provide energy simultaneously to multiple electronic portable devices 104.

The portable electronic device 104 may be any type of device capable of receiving power via an electromagnetic field. For purposes of disclosure, the present invention is described in connection with a particular portable electronic device 104 for receiving power from an inductive power supply 102. The present invention, is however, well suited for use with other portable electronic circuitry and may alternatively include essentially any portable electronic device circuitry capable of receiving power from an inductive power supply 102.

The portable electronic device 104 is described as an integrated device with an inductive receiver unit and device circuitry combined. The portable electronic device 104 may, however, be a separate stand-alone inductive receiver unit capable of being connected to or integrated with essentially any type of electronic device. In one example, the portable electronic device 104 may be a cellular phone or other mobile device and may be placed near the inductive power supply 102 to receive power wirelessly for performing operations, such as battery charging, operating a display, or processor functions. In another example, the portable electronic device 104 may be an adapter that connects to another device for providing it power from the inductive power supply 102.

Figure 9:
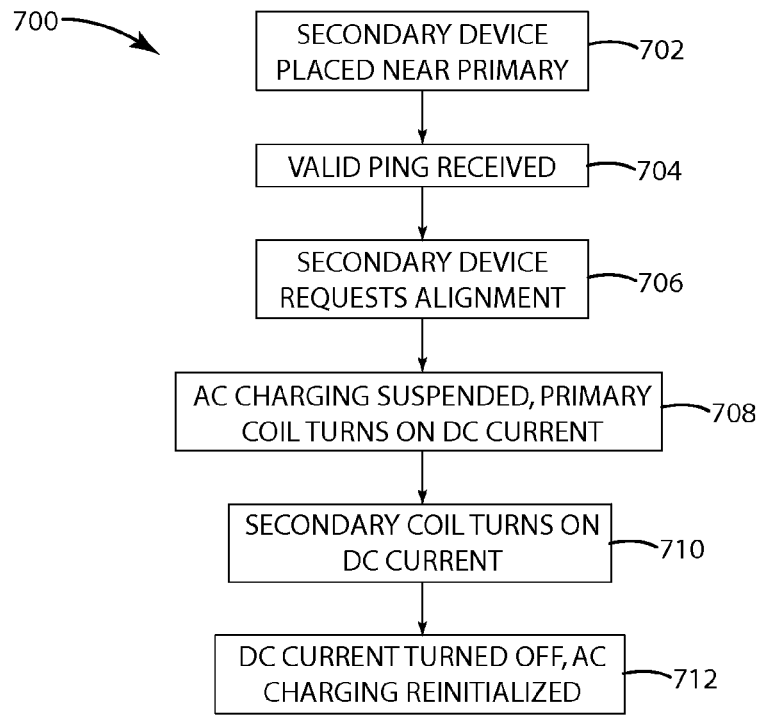
FIG. 9 shows one method for operating the DC coil drive system.
Figure 10:
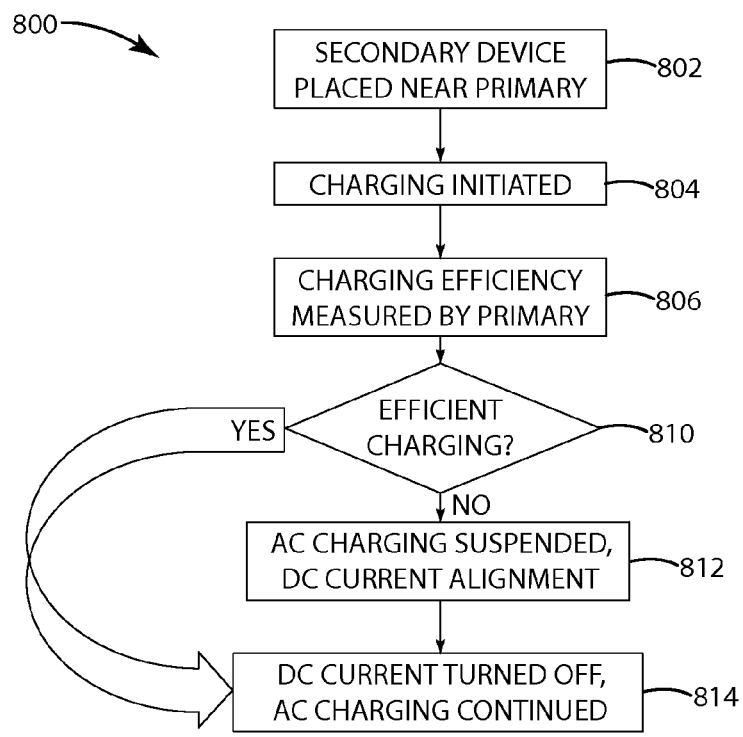
FIG. 10 shows one method for operating the DC coil drive system.
Figure 11:
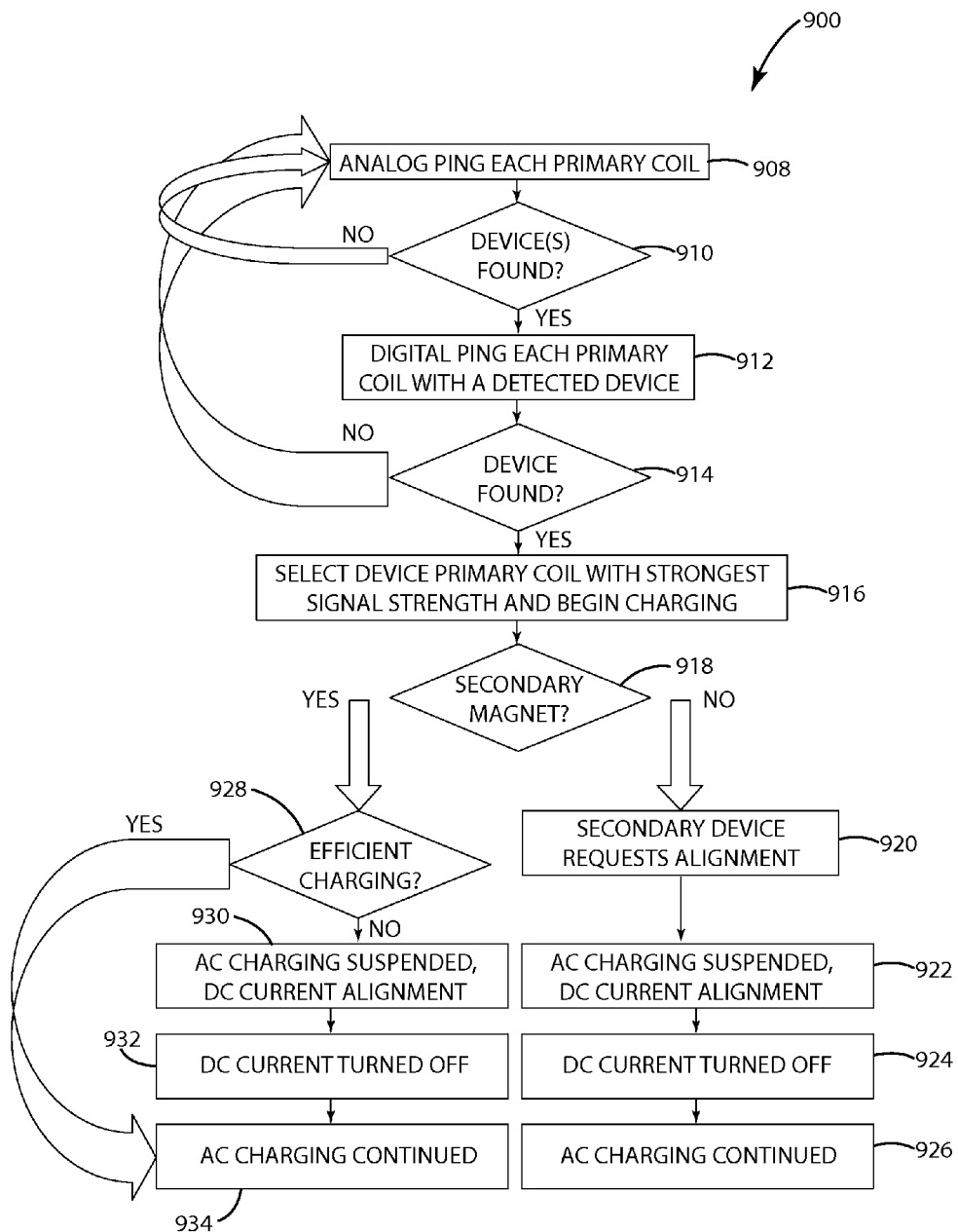
FIG. 11 shows one method for operating the DC coil drive system.

Various methods of aiding alignment of the DC coil drive system 100 are shown in FIGS. 9-11. Of course, the method of aiding alignment may change from application to application depending on the inductive power supply 102 and portable electronic device 104 configurations. In one embodiment, the wireless power system may begin an alignment operation by supplying DC current to a wireless induction coil, such as primary coil 112 or secondary coil 132. This may generate a temporary DC magnetic field that interacts with another DC magnetic field produced in either the inductive power supply 102 or the portable electronic device 104. Accordingly, an attractive force may be produced between the inductive power supply 102 and the portable electronic device 104 for aiding alignment.

In the illustrated embodiment of FIG. 1, the DC coil drive system 100 includes an inductive power supply 102 and an electronic portable device 104 capable of receiving wireless power. The inductive power supply 102 may include a power supply 120, controller 116, inverter 118, and tank circuit 110. In alternative embodiments, the inductive power supply 102 may include a primary magnet (not shown). The inductive power supply 102 may convert energy from one form, such as AC line voltage from AC mains 122, to another for wireless energy transfer. In alternative embodiments, the AC mains 122 may be DC power inputs or another suitable energy source. Controller 116 and inverter 118 may include circuitry well known in the art, where the controller 116 and inverter 118, including associated switches SW1, SW2, SW3, may drive tank circuit 110 with an AC or DC signal. For example, the inverter 118 may provide an AC signal to tank circuit 110 to generate AC magnetic flux for transmission of energy to electronic portable device 104. The inverter 118 may also provide a DC signal to tank circuit 110 to generate a DC magnetic field from the tank circuit 110.

The inductive power supply 102 may have the ability to communicate with an electronic portable device 104. For example, the inductive power supply 102 and electronic portable device 104 may communicate to each other using a modulation technique through the primary inductor 112 and secondary inductor 132. As another example, inductive power supply 102 and electronic portable device 104 may have transceivers for communication.

Tank circuit 110 includes a primary resonant capacitor 114 and a primary inductor 112. FIG. 1 shows a series arrangement of the primary resonant capacitor 114 and primary inductor 112, but alternative embodiments may include a parallel arrangement or another arrangement suitable for transferring power wirelessly to an electronic portable device 104. In one alternative arrangement, the inductive power supply 102 may include a primary inductor 112 and not a primary resonant capacitor 114 for transferring energy wirelessly via an inductor without resonance.

The controller 116 in FIG. 1 may control whether the primary coil 112 is driven in AC mode for wireless power transfer or DC mode for magnetic attraction. During wireless power transfer, the primary coil 112 may be driven with AC current from the inverter 118 by placing the switch SW1 in the open position and opening and closing inverter switches SW2, SW3 to generate AC current in the primary coil. For magnetic attraction, the primary coil 112 may be driven with a DC current, which is essentially a pass-through of the DC input to the inverter through switch SW1 in the closed position. During magnetic attraction mode, the inverter switches SW2, SW3, may both be in the open position.

The primary magnet in some embodiments may be a permanent magnet made of materials well known in the art. Alternatively, the primary magnet may be a temporary magnet or magnetic attractor made of a soft ferromagnetic material that may produce a magnetic field when aligned with an independent magnetic field. For example, a piece of iron may produce a magnetic field when in the presence of an independent magnetic field produced by a coil of wire with a DC current flowing through it.

In the current embodiment, the electronic portable device 104 may include a secondary wireless power receiver 130, a rectifier 136, a DC/DC converter 138, load 140, energy storage element 142, secondary controller 144, and secondary magnet 108. The secondary magnet 108 or magnetic attractor may be similar to the primary magnet described above. In alternative embodiments, the secondary magnet 108 may not be included in electronic portable device 104. The load 140 may include a battery or other electronic portable device 104 related circuitry. For example, the electronic portable device 104 may be a cellular phone with a rechargeable battery. The rectifier 136 and DC/DC converter 138 may include components well known in the art for transforming the energy received by the secondary wireless power receiver 130 into a useable form for the electronic portable device 104.

The secondary controller 144 may include circuitry well known in the art for providing energy to secondary inductor 132. Secondary controller 144 may transfer energy from energy storage element 142 to secondary inductor 132 to produce a DC magnetic field when the electronic portable device 104 seeks to perform an alignment operation. The energy storage element 142 may be a battery, capacitor, supercapacitor, or another suitable energy storage device. In an alternative embodiment, energy storage element 142 may be a battery included in the load 140.

The secondary wireless power receiver 130 may include a secondary resonant capacitor 134 and a secondary inductor 132, where the secondary wireless power receiver 130 may enable the electronic portable device 104 to receive power without a physical connection to the inductive power supply 102. The illustrated embodiment of FIG. 1 shows a series resonant arrangement for the secondary wireless power receiver 130, but alternative embodiments may include parallel resonant arrangements or non-resonant arrangements. For example, a non-resonant arrangement may not include resonant capacitor 134.

Figure 2A:
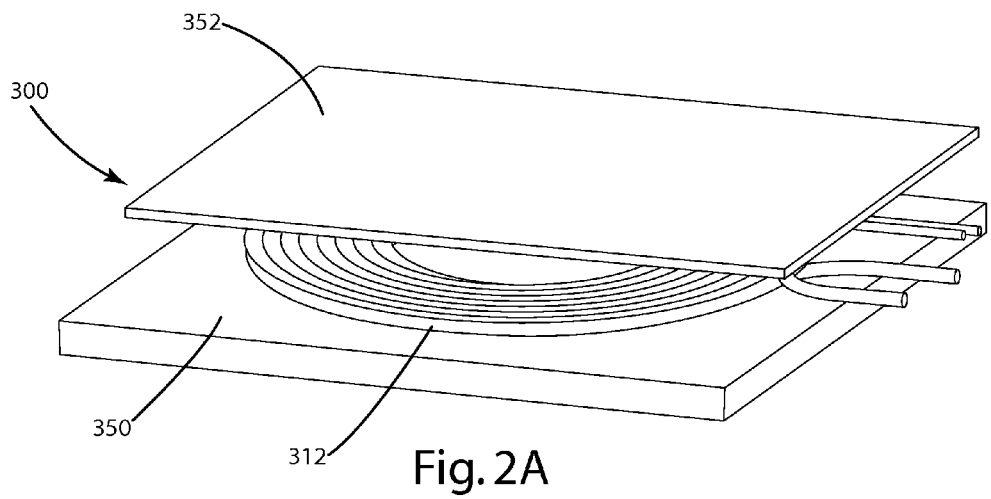
FIG. 2a illustrates a perspective view of a physical configuration of the current embodiment of the DC coil drive system.
Figure 2B:
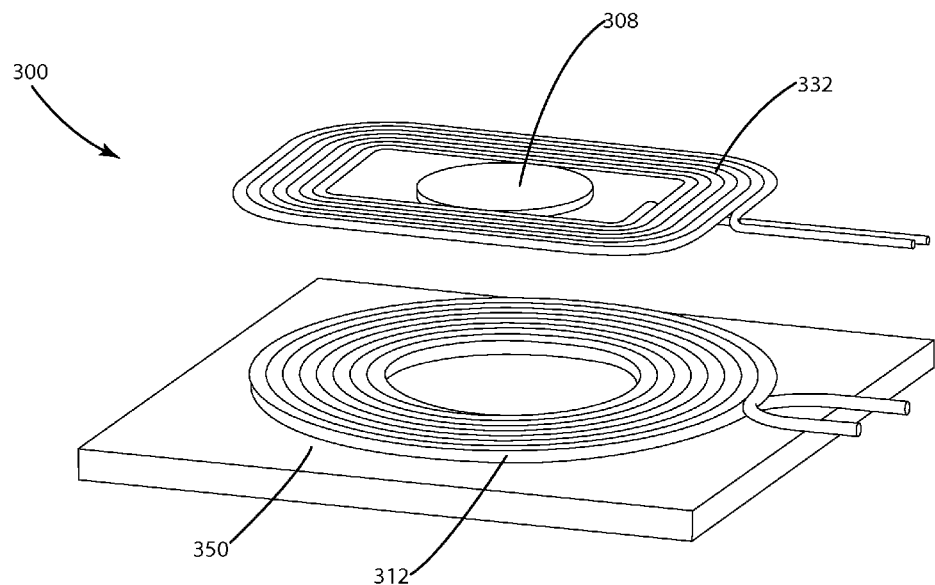
FIG. 2b illustrates a perspective view of a physical configuration of the current embodiment of the DC coil drive system with the secondary magnetic shield hidden.
Figure 2C:
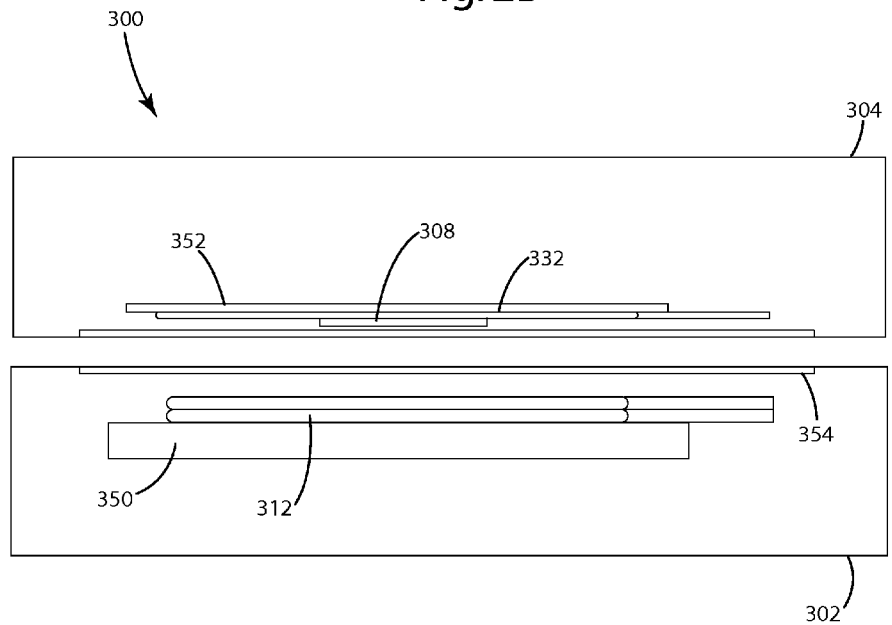
FIG. 2c illustrates a profile view of a physical configuration of the current embodiment of the DC coil drive system.

FIGS. 2a-c illustrate various configurations of the current embodiment. The DC coil drive system 300 includes components similar to the embodiments described regarding FIG. 1. The inductive power supply 302 may include primary inductor 312, inductive power supply circuitry, primary shielding 350, and charging surface 354. Inductive power supply circuitry may include a power supply, controller, and inverter, which may be similar to power supply 120, controller 116, and inverter 118 described in other embodiments. Primary shielding 350 may be made of a material capable of guiding magnetic flux of the DC coil drive system 300.

The primary inductor 312 may be similar to the primary inductor 112 described above. Primary inductor 312 may be capable of producing an AC magnetic field for energy transfer to the electronic portable device 304. The primary inductor 312 may produce a DC magnetic field from the inductive power supply 302 in order to generate an attractive force that aids alignment with the secondary inductor 332. In alternative embodiments, where a primary magnet is included in inductive power supply 302, primary inductor 312 and the primary magnet may generate a DC magnetic field from the inductive power supply 302.

Inductive power supply 302 may be embedded in a larger structure, such as a tabletop, and may include a surface on which an electronic portable device 304 may be placed for charging. Alternatively, the inductive power supply 302 may be a stand-alone device with a surface 354 to place an electronic portable device 304 against for charging. A surface portion of the inductive power supply 302 may be a charging surface 354, which may also be adjacent to primary inductor 312. In alternative embodiments, inductive power supply 302 may include an array of primary inductors 312 adjacent to the charging surface 354. In yet further alternative embodiments, this array of primary inductors 312 may include primary magnets associated with each primary inductor 312 in the array. In the current embodiment, when electronic portable device 304 is placed near the charging surface 354, (1) inductive power supply 302 may transfer energy to electronic portable device 304, or (2) the DC coil drive system 300 may use an alignment operation to urge the secondary inductor 332 toward alignment with specific areas of the charging surface 354. These specific areas may allow for more efficient energy transfer than other areas of charging surface 354.

In the current embodiment, electronic portable device 304 may be similar to electronic portable device 104 such that it may include secondary inductor 332, secondary magnet 308, and secondary electronics circuitry. Secondary electronics circuitry may include circuitry similar to the embodiment of FIG. 1, such as a rectifier 136, DC/DC converter 138, load 140, energy storage element 142, secondary controller 144, and secondary resonant capacitor 134. In alternative embodiments, electronic portable device 304 may not include secondary magnet 308. Returning to the current embodiment, the electronic portable device 304 may further include secondary shielding 352, which may be made of a material capable of guiding magnetic flux. The secondary magnet 308 and secondary inductor 332 may be located relative to each other such that secondary magnet is located near the center of secondary inductor 332. Secondary magnet 308 and secondary inductor 332 may produce a DC magnetic field from the electronic portable device 304 comprising DC magnetic fields generated from secondary magnet 308 and secondary inductor 332. In alternative embodiments where secondary magnet 308 is not included in electronic portable device 304, secondary inductor 332 may produce a DC magnetic field from the electronic portable device 304.

Figure 3:
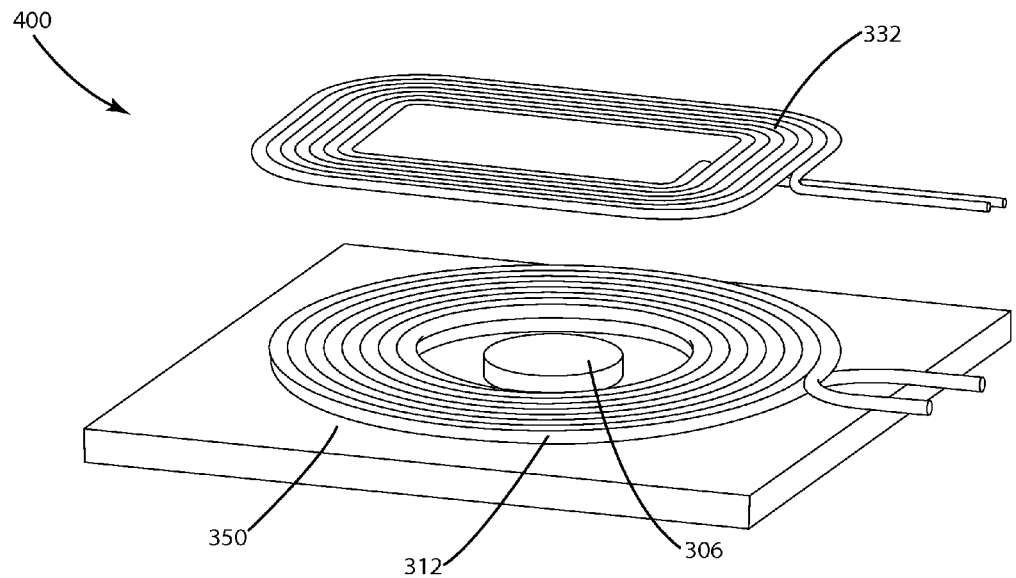
FIG. 3 illustrates a physical configuration of a second embodiment of the DC coil drive system.
Figure 4:
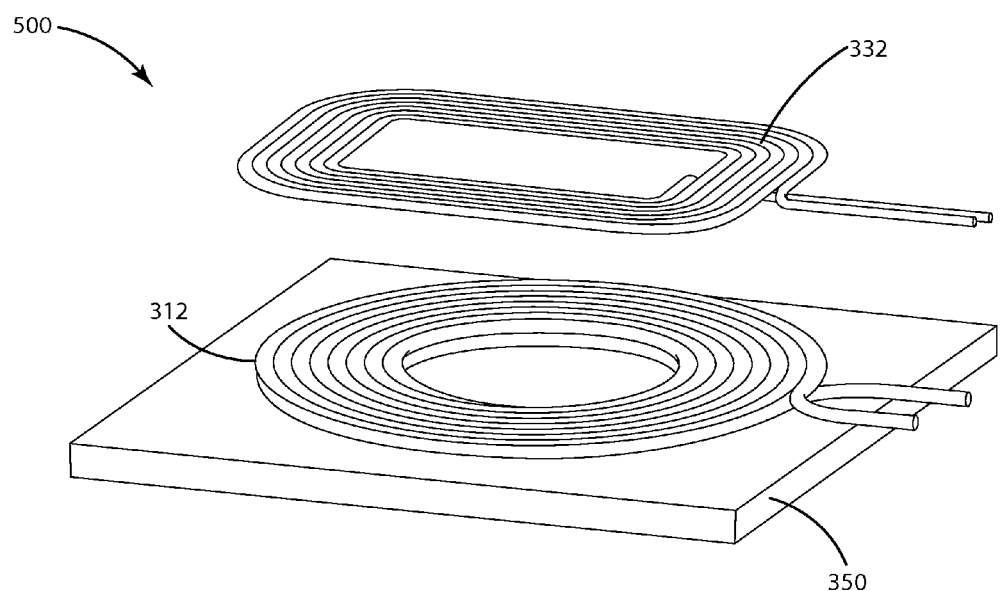
FIG. 4 illustrates a physical configuration of a third embodiment of the DC coil drive system.

Referring now to FIG. 3, the second embodiment of the physical configuration of the DC coil drive system 400 is shown. The DC coil drive system 400 includes components similar to the embodiments described with regard to FIGS. 2a-c. The primary coil 312 in this configuration is shown with an associated primary magnet 306, which may be located near the center of the primary coil 312. The primary magnet 306 may be similar to the primary magnet described above. The primary coil 312 may act as an inductive power transfer coil when driven with an AC current, and may act as an electromagnet that interacts with the secondary coil 332 when driven with a DC current. The secondary coil 332 in this configuration is shown without an associated secondary magnet, and may be used to generate a DC magnetic field for magnetic attraction.

Also shown in FIG. 3 are possible coil configurations for primary coil 312 and secondary coil 332. The inductive power supply may include a primary inductor or inductive element configured similarly to the primary coil 312. Further, a secondary inductor included in the electronic portable device may also be configured similarly to the secondary coil 332. In the illustrated embodiment, primary coil 312 is formed from a layered spiral of conductive material and includes a void near the center. Alternatively, the coil 312 may form a flat spiral or form a spiral from the center outward without a void. The void near the center may allow for placement of the primary magnet 306. The primary coil 312 is not limited to spiral configurations, and may be formed from any number of different conductive material configurations. Any primary coil 312 configuration capable of producing a magnetic field may be used. For example, the primary coil 312 may be made of a helical winding of conductive material or a single loop of conductive material. The coil may also have multiple turns stacked together in any direction. In the second embodiment, primary coil 312 may be a coil of wire attached to electronic circuitry using various methods that are well known in the art. In alternative embodiments, the primary coil 312 may be a printed circuit board (PCB) trace. The physical configuration of secondary coil 332 may vary similarly to the primary coil 312 described above.

Figure 5:
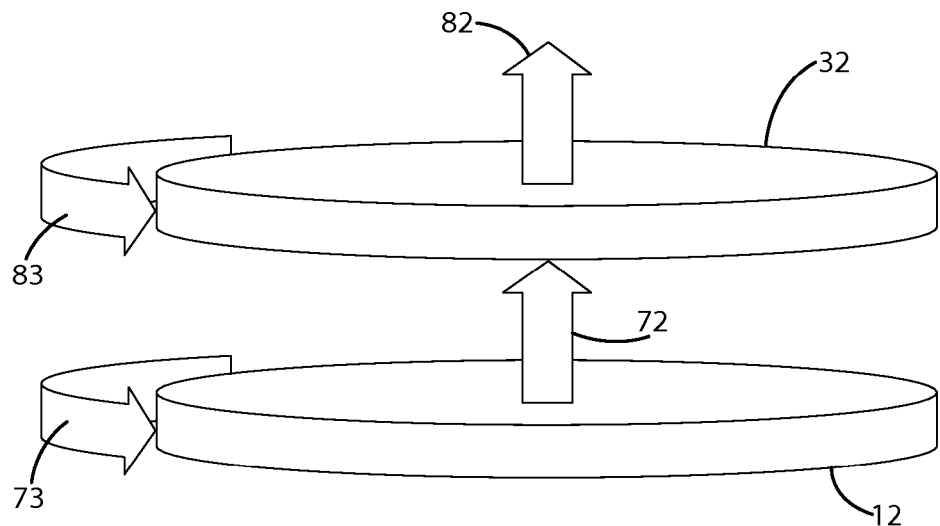
FIG. 5 illustrates a representative view of the third embodiment of the DC coil drive system.

Turning to the third embodiment of the DC coil drive system 500 illustrated in FIG. 5, primary coil 312 and secondary coil 332 are both shown without associated magnets. The DC coil drive system 500 may include components similar to the embodiments described with regard to FIGS. 2a-c. Both the primary coil 312 and the secondary coil 332 in this configuration may generate a DC magnetic field in response to a DC current. When the two fields are in the same direction, an attractive force may help to urge alignment of the two coils. After an alignment operation occurs, an AC current may be applied to the primary coil 312 to transfer power inductively to the secondary coil 332.

As shown in FIG. 5, the third embodiment of the DC coil drive system may use primary inductor 12 and secondary inductor 32 to create an attractive force for alignment of the inductive power supply and electronic portable device. Primary inductor 12 may be similar to each of the primary inductors 112, 312, 412 described above, and may be located within an inductive power supply. Secondary inductor 32 may be similar to each of the secondary inductors 132, 332, 412 described above, and may be located in an electronic portable device.

In the third embodiment, the inductive power supply and electronic portable device may cause DC current 73, 83 to flow through primary inductor 12 and secondary inductor 32, respectively. The DC current 73 through primary inductor 12 produces a magnetostatic field or DC magnetic field around primary inductor 12, which is represented by DC magnetic flux 72. The DC magnetic flux 72 is a vector representation of the DC magnetic field near the center of primary inductor 12 when DC current 73 flows in the direction shown. The DC current 83 flowing through secondary inductor 32 produces similar results. The DC magnetic flux 82 is a vector representation of the DC magnetic field near the center of secondary inductor 32 when DC current 83 flows in the direction shown. As is well known in the art, the DC magnetic field generated by primary inductor 12 may produce force that acts on moving charge, such as current flowing in secondary inductor 32. The DC magnetic field produced by secondary inductor 32 may also produce force that acts on moving charge, such as the current flowing in primary inductor 12. When the DC magnetic fluxes 72, 82 from the primary inductor 12 and secondary inductor 32 are in the same direction, an attractive force between the secondary inductor 32 and primary inductor 12 may be produced.

In the third embodiment, an alignment operation may use DC magnetic fields to produce an attractive force between primary inductor 12 and secondary inductor 32. If the primary inductor 12 and secondary inductor 32 are misaligned, then an alignment operation may aid vertical alignment between primary inductor 12 and secondary inductor 32. The vertical alignment of the primary inductor 12 and secondary inductor 32 may allow for more efficient operation during wireless energy transfer from the inductive power supply to the electronic portable device. The DC magnetic flux present during the alignment operation may be removed when DC current is no longer provided to the primary inductor 12, secondary inductor 32, or both. This may allow for efficient wireless energy transfer using an AC magnetic field.

In an alternative embodiment, the alignment operation may include haptic feedback to the user. The attractive force produced by the DC magnetic fields may be used to provide feedback to the user so that the user can sense a direction of force and move the secondary inductor 32 into alignment with the primary inductor 12 for efficient wireless energy transfer. For example, if the attractive force is not strong enough to move the portable electronic device into alignment on its own, then the haptic feedback may be used to guide the user to manually align the electronic portable device with the inductive power supply.

Figure 6:
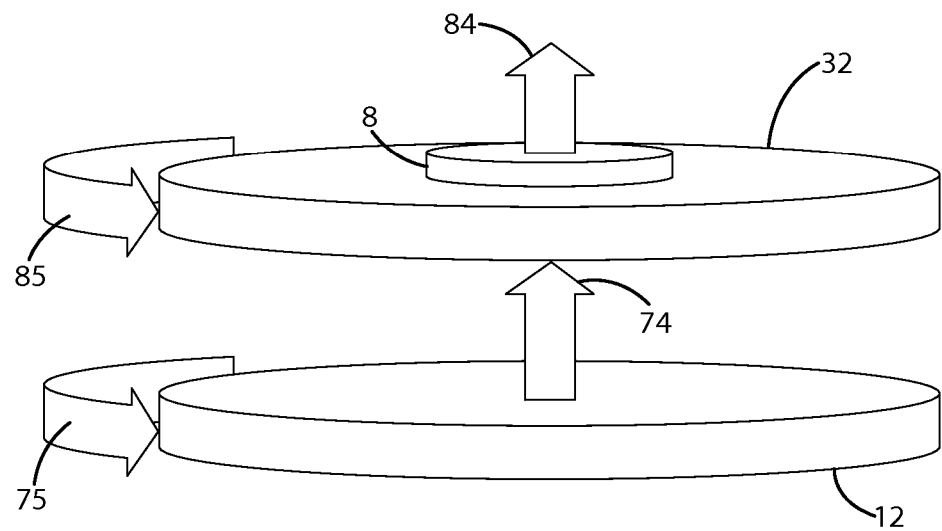
FIG. 6 illustrates a representative view of the current embodiment of the DC coil drive system.
Figure 7:
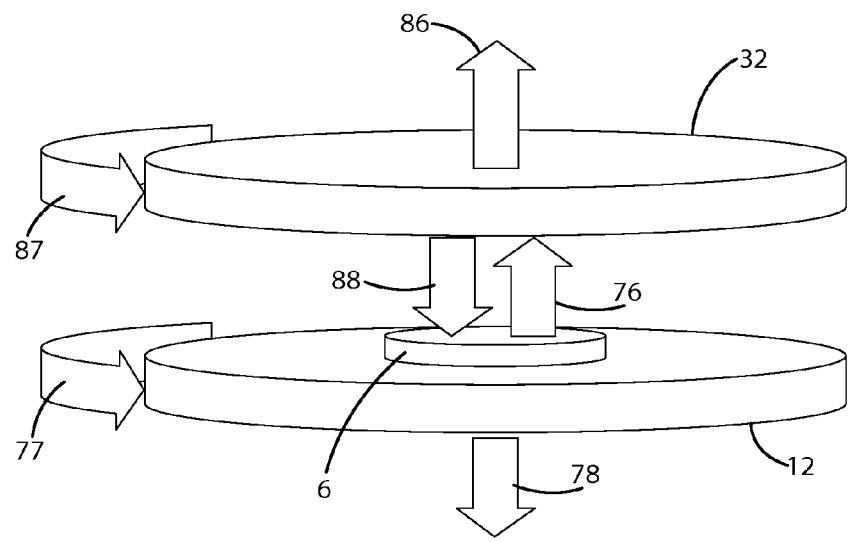
FIG. 7 illustrates a representative view of the second embodiment of the DC coil drive system.

As shown in FIGS. 6 and 7, the DC coil drive system may use at least one of primary inductor 12, secondary inductor 32, and a magnet to create a DC magnetic field for alignment of the inductive power supply and electronic portable device. As shown in FIG. 6, the DC coil drive system includes primary inductor 12, secondary inductor 32, and secondary magnet 8. Secondary magnet 8 may be similar to each of the secondary magnets 108, 308 described above. The DC coil drive system may use the secondary magnet 8 to produce a DC magnetic field in the electronic portable device. DC magnetic flux 84 is a vector representation of this DC magnetic field near the center of secondary magnet 8, where the secondary magnet 8 may have a magnetic moment in the same direction as DC magnetic flux 84. In alternative embodiments, the DC coil drive system may use a combination of the secondary magnet 8 and DC current 85 to produce a DC magnetic field. In these embodiments, the DC magnetic field produced by DC current 85 through secondary inductor 32 may supplement the DC magnetic field produced by secondary magnet 8.

The primary inductor 12 may be used to produce a DC magnetic field similar to the embodiment described in FIG. 5.

The DC magnetic flux 74 is a vector representation of this field near the center of primary inductor 12 when DC current 75 flows through primary inductor 12 in the direction shown. As discussed with regard to the embodiment of FIG. 5, the DC magnetic fields produced by the primary inductor 12 and secondary magnet 8 may cause mutual force that acts on charge moving in a medium, such as current in primary inductor 12 or electrons in a magnet. When the DC magnetic fluxes 74, 84 of the primary inductor 12 and secondary magnet 8 are in the same direction, an attractive force between the two may be produced. This attractive force may cause the primary inductor and secondary magnet 8 to achieve alignment. After the alignment operation, the primary inductor 12 may begin producing AC magnetic flux for wireless energy transfer rather than DC magnetic flux, where the DC magnetic flux may produce inefficiencies if present during wireless energy transfer.

In alternative embodiments where the DC coil drive system uses a combination of secondary magnet 8 and DC current 85 through secondary inductor 32 to produce a combined DC magnetic field from the electronic portable device, the combined DC magnetic field may interact with a DC magnetic field generated by primary inductor 12 to produce a similar result to the previously described embodiments. In these alternative embodiments, the secondary magnet 8 and DC current through secondary inductor 32 both produce DC magnetic fields that may supplement each other. Accordingly, the strength or magnetic flux density of the secondary magnet 8 used to produce the appropriate attractive force may be less than a secondary magnet 8 used alone, and the amount of DC magnetic flux in the system during wireless power transfer may be further reduced.

Figure 8:
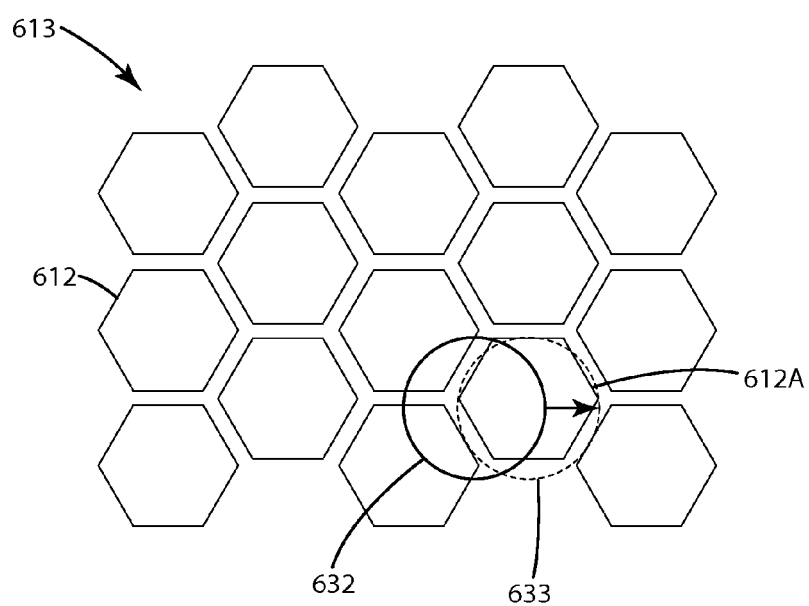
FIG. 8 illustrates a representative view of a fourth embodiment of the DC coil drive system.

The embodiment of FIG. 7 is similar to the embodiment of FIG. 8, except that DC coil drive system includes primary magnet 6 in the inductive power supply rather than secondary magnet 8 in the electronic portable device. Primary magnet 6 may be similar to secondary magnet 8. Further, primary magnet 6 may produce a DC magnetic field that interacts with a DC magnetic field produced in the electronic portable device to yield results similar to the previous embodiments. The functionality of primary magnet 6 is also similar to secondary magnet 8 in that its DC magnetic field may be supplemented with a DC magnetic field produced by DC current 77 flowing through primary inductor 12. FIG. 7 also illustrates DC magnetic fluxes 76, 86 similar to DC magnetic fluxes 74, 84 described previously. Further, DC magnetic forces 78, 88 are shown in this embodiment.

The DC coil drive system of FIG. 8 illustrates a fourth embodiment that includes an inductive power supply with a primary inductor array 613. The primary inductor array 613 may include multiple primary inductors 612 that may be either individually energized or energized in groups to transfer power to an electronic portable device with a secondary inductor 632. The primary inductors 612 and secondary inductor 632 may be respectively similar to each of the primary inductors 12, 112, 312 and secondary inductors 32, 132, 332 described with regard to other embodiments. In alternative embodiments, primary inductors 612 may have associated primary magnets similar to the primary magnets 6, 106, 306 described in other embodiments. In yet further alternative embodiments, secondary inductor 632 may have an associated secondary magnet similar to the secondary magnets 8, 108, 308 described in other embodiments.

In the fourth embodiment, the primary inductor array 613 may be setup so that at least one primary inductor 612 is in sufficiently close proximity to a secondary inductor 632 to cause an alignment operation. Secondary inductor 633 may be a representation of secondary inductor 632 after an alignment operation, which caused secondary inductor 632 to move. The alignment operation may take the form of any of the previously described embodiments. For example, at least one primary inductor 612 and secondary inductor 632 may each produce a DC magnetic field that interacts with each other, which may result in an attractive force between at least one primary inductor 612 and secondary inductor 632. Alternatively, magnets may be used in either the inductive power supply or electronic portable device alone or in combination with a DC magnetic field generated from either at least one primary inductor 612 or a secondary inductor 632.

In alternative embodiments, at least one primary inductor 612 of the primary inductor array 613 may produce a DC magnetic field causing an attractive force that acts on a magnet or magnetic attractor to align the secondary inductor 632. Further, at least one primary inductor 612 may produce a DC magnetic field causing a repulsive force that acts on a magnet or magnetic attractor to align the secondary inductor 632. The attractive and repulsive forces may be used alone or in combination during an alignment operation to align the secondary inductor 632. Alternatively, the attractive and repulsive forces may be used to push a portable device off the charging surface if the portable device is not compatible with the inductive power supply or if a charging cycle completes.

The alignment operation shown in FIG. 8 uses an individual primary inductor 612a to align with a secondary inductor 632. In alternative embodiments, more than one or a group of primary inductors 612 in the primary inductor array 613 may generate a DC magnetic field that aligns secondary inductor 632 with a desired location on the charging surface. For example, a group of three primary inductors 612 may generate a combined DC magnetic field that urges the secondary inductor to align with a specific location relative to the group of three primary inductors 612.

FIG. 9 shows one embodiment of a method for operating the DC coil drive system 100. Operation may begin when an electronic portable device 104 is placed near a primary inductor 112 adjacent to a charging surface of the inductive power supply 102. Step 702. The inductive power supply 102 may ping for presence of the electronic portable device 104 using the primary inductor 112. Step 704. Alternatively, the inductive power supply 102 may use a transmitter (not shown) to ping for presence of the electronic portable device 104. In yet other embodiments, the electronic portable device 104 may ping for presence of the inductive power supply 102 using secondary inductor 132 or a transmitter (not shown). Further, presence detection may be inherent in some embodiments, where a ping may not be used.

Regardless of whether presence is known, the electronic portable device 104 may send a request for alignment to the inductive power supply 102. Step 706. Alternatively, the inductive power supply 102 may send a request for alignment to the electronic portable device 104. After a request is received, the DC coil drive system 100 may suspend AC charging and begin providing DC current to the primary inductor 112. Step 708. Alternatively, AC charging may not be suspended because the DC coil drive system 100 is not currently AC charging the electronic portable device 104. In the current embodiment, electronic portable device 104 may begin providing DC current to the secondary inductor 132 after a request for alignment is received. Step 710. As described in previous embodiments, the DC current through the primary inductor 112, secondary inductor 132, or both creates a DC magnetic field. In embodiments where the inductive power supply 102 or electronic portable device 104 includes a magnet, the DC coil drive system 100 may not provide DC current to the respective primary inductor 112 or secondary inductor 132 to produce a DC magnetic field.

In alternative embodiments, the DC coil drive system 100 may begin providing DC current to either the secondary inductor 132 or primary inductor 112 without sending or receiving a request for alignment.

After a period of time where the DC magnetic fields in the inductive power supply 102 and electronic portable device 104 are used to produce an attractive force between the inductive power supply 102 and electronic portable device 104, the DC coil drive system 100 may turn off DC current to the primary inductor 112, secondary inductor 132, or both. The period of time may be a preset amount of time or it may be determined from operational parameters of the DC coil drive system 100, such as power transfer efficiency. AC charging of the electronic portable device 104 may begin. Step 712.

In alternative embodiments, the electronic portable device 104 may request an alignment operation after power transfer is initiated. This request may be made each time a valid power transfer is initiated.

FIG. 10 shows another embodiment of a method for operating the DC coil drive system 100. Operation may begin when an electronic portable device 104 is placed near a primary inductor 112 adjacent to a charging surface of the inductive power supply 102. Step 802. In this embodiment, the DC coil drive system 100 begins providing power to the electronic portable device 104. Step 804. Alternatively, the DC coil drive system 100 may perform an alignment operation before initiating power transfer. In the current embodiment, the DC coil drive system 100 may determine the power transfer efficiency by measuring operational parameters. Step 806. Operational parameters may include measurements such as voltage or current at different locations within the DC coil drive system 100. If the DC coil drive system 100 determines that the power transfer efficiency is acceptable, then it may continue providing power to the electronic portable device 104. If the power transfer efficiency is not acceptable, then the DC coil drive system 100 may suspend power transfer and begin an alignment operation using DC current through the primary inductor 112, secondary inductor 132, or both. Step 812. The DC coil drive system 100 may continue power transfer after the alignment operation has completed. Step 814.

In alternative embodiments, the DC coil drive system 100 may continue to monitor the power transfer efficiency after an alignment operation has occurred. If the efficiency becomes unacceptable, the DC coil drive system 100 may perform another alignment operation using DC current through the primary inductor 112, secondary inductor 132, or both.

FIG. 11 shows one embodiment of a method for operating the DC coil drive system 100. In this embodiment, the DC coil drive system 100 may include an array of primary inductors similar to the embodiment described with regard to FIG. 8. In this embodiment, primary inductor array 613 may be connected to a single inductor driver through a switch matrix so that individual primary inductors 612 may be selected. In alternative embodiments, groups or sections of primary inductors 612 may be selected using a switch matrix and more than one inductor driver. The DC coil drive system 100 may select each primary inductor 612 in the primary inductor array 613 for an analog ping. Step 908. If any primary inductors 612 detect an electronic portable device, then each of those primary inductors 612 may perform a digital ping. Steps 910 and 912. The primary inductor 612 that receives the strongest signal strength may then begin transferring power to the electronic portable device. Step 916. If the electronic portable device includes a secondary magnet, then the DC coil drive system may determine the power transfer efficiency by measuring operational parameters. The DC coil drive system may then perform an alignment operation if the power transfer efficiency is less than acceptable. If the electronic portable device does not include a secondary magnet, then the DC coil drive system may perform an alignment operation at the beginning of each power transfer. Step 918. In alternative embodiments, the DC coil drive system may use one of the methods previously described with regard to FIGS. 9 and 10 to transfer power to an electronic portable device after a primary inductor 612 or group of primary inductors 612 is selected.

Figure 12:
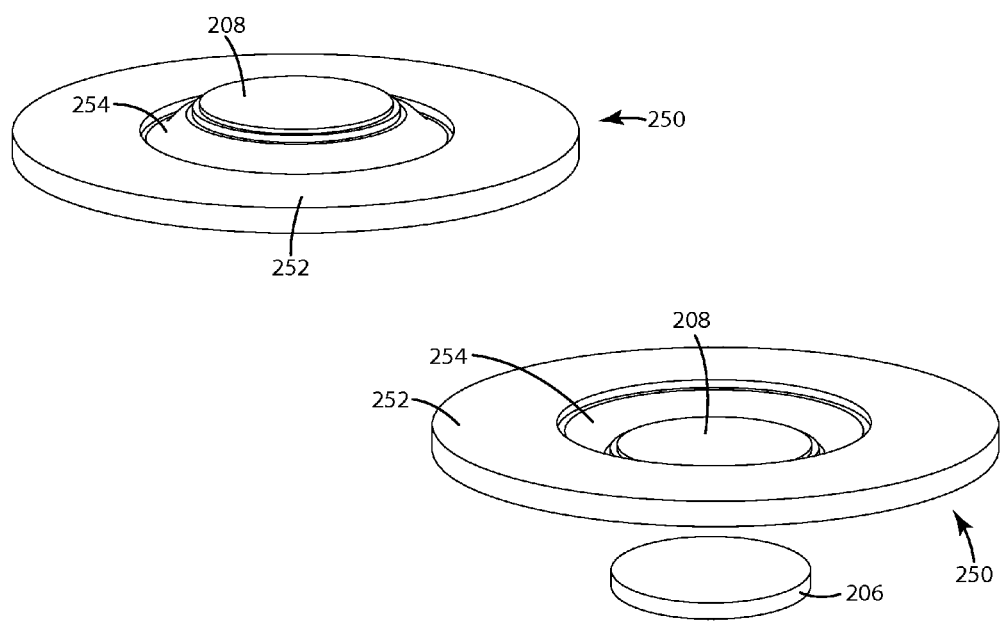
FIG. 12 illustrates a physical configuration of a fifth embodiment of a system having a movable frictional material.
Figure 13:
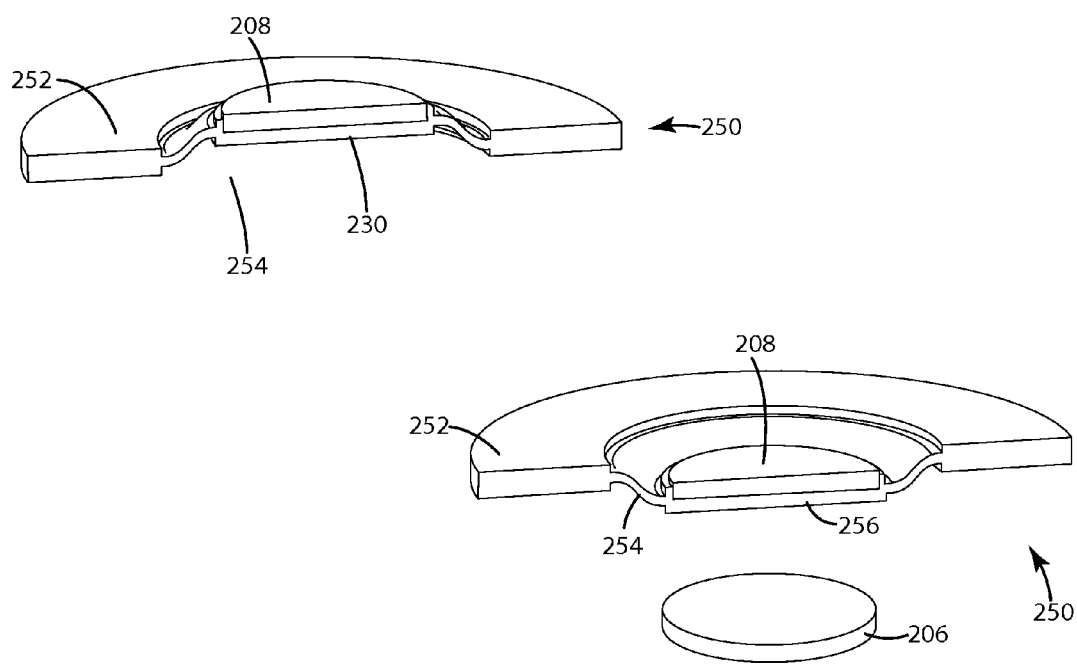
FIG. 13 illustrates a sectional view of the physical configuration of the fifth embodiment of the system having a movable frictional material.
Figure 14:
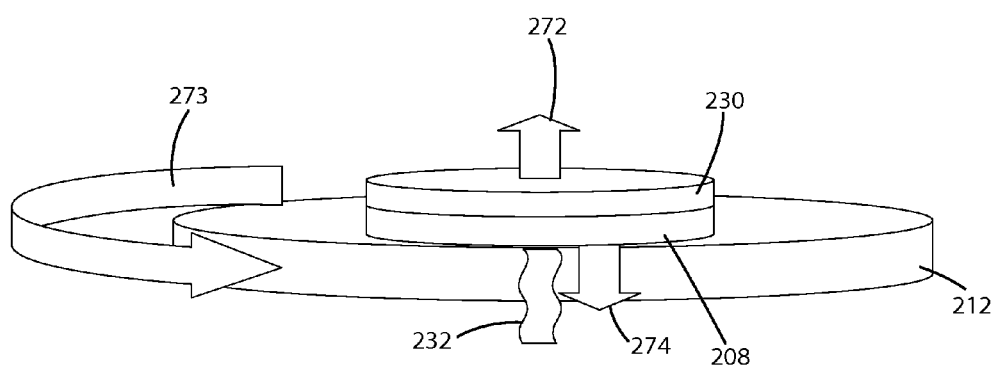
FIG. 14 illustrates a representative view of a fifth embodiment of the system having a movable frictional material.

For the fifth embodiment, illustrated in FIGS. 12-14, a frictional material 230, such as a rubberized material, is attached to the housing of at least one of an inductive power supply and an electronic portable device. The inductive power supply and electronic portable device may be similar to those described above, and may or may not have a DC coil drive system.

The frictional material 230 may be configured to increase the amount of force to move the electronic portable device over the surface of the inductive power supply. For example, the frictional material 230 may have a coefficient of friction (COF) from 1 to 2, or a COF higher than that of the housing material, such as plastic having a COF less than 0.5. The COF of the frictional material 230 may also be higher than a COF of an engaging surface, which the frictional material 230 contacts in response to alignment between the electronic portable device and the inductive power supply. In this way, if the frictional material 230 is not in contact with the engaging surface, the lesser friction surfaces may allow the electronic portable device to slide over the surface of the inductive power supply more easily, relative to the amount of force to move the electronic portable device over the surface if the frictional material 230 is in contact with the engaging surface.

The frictional material 230 may be incorporated into a one-piece rubber component 250 coupled to a housing of at least one of the inductive power supply 302 and electronic portable device 304, which are described above with respect to FIG. 2C. The frictional material 230 may form a pad on the one-piece rubber component 250, and may be circular (as shown), square, ring shaped, or a plurality of nubs protruding from the surface of the pad. Further, the frictional material 230 may form the entire surface of the pad or a portion of the pad.

The one-piece rubber component 250 also may include a mounting flange 252 and a flexible diaphragm region 254. A magnet or ferromagnetic slug 208 (similar to the primary magnet described above) may be disposed on a side of the one-piece rubber component 250 opposite a contact surface of the frictional material 230. In alternative embodiments, the frictional material 230 and ferromagnetic slug 208 may be coupled to the housing via a spring or other suitable construction other than the one-piece rubber component 250.

The flexible diaphragm region 254 may allow the frictional material 230 to return to a normal state, which is in a retracted or an engaged position depending on the configuration. The flexible diaphragm region 254 may be spring-like such that, if the ferromagnetic slug 208 is not being urged to move from the normal state, the flexible diaphragm region 254 maintains or returns the frictional material 230 to the normal state or position. Alternatively, gravity may force the flexible diaphragm to maintain or return to the normal state or position if the ferromagnetic slug 208 is not being urged to move from the normal state.

The mounting flange 252 may facilitate coupling to the housing of at least one of the inductive power supply and electronic portable device. The ferromagnetic slug 208 may be located centrally, coaxially, or at a different location with respect to a primary coil of the inductive power supply or a secondary coil of the electronic portable device. For instance, the ferromagnetic slug 208 and frictional material 230 may be located at least 2 cm from the primary coil or the secondary coil, depending on the configuration.

In use in one embodiment, the frictional material 230 may be in a retracted position in the inductive power supply such that the user can freely slide the electronic portable device on the charging surface. Put another way, in response to the electronic portable device not being aligned with the inductive charger, the frictional material 230 is retracted into a cavity. In response to alignment of the electronic portable device with the inductive power supply for transferring power, the frictional material 230 may engage the surface of the electronic portable device. Such engagement, in some embodiments, may provide haptic feedback to the user so that the user perceives proper alignment between the electronic portable device and the inductive power supply. In alternative embodiments, if the frictional material 230 is located in the electronic portable device, the frictional material 230 may engage the surface of the inductive power supply.

As one example of the current embodiment, the frictional material 230 and a ferromagnetic slug 208, which is disposed near the frictional material 230, are located in the electronic portable device. In this example, the frictional material 230 remains in a retracted position as its normal state. As discussed previously, in this state, the electronic portable device may freely move on the inductive power supply. In response to the ferromagnetic slug 208 being urged toward a permanent magnet 206, which is located in the inductive power supply, the frictional material 230 leaves its normal state, engaging the surface of the inductive power supply. In this way, the frictional material 230 may prevent or reduce free movement of the electronic portable device on the inductive power supply in response to achieving proper alignment. The frictional material 230 may engage the inductive power supply such that the force to disengage or misalign the inductive power supply and electronic portable device is greater than the force to move the electronic portable device on the inductive power supply if the frictional material is not engaged. Selection of the disengagement or misalignment force is a matter of design choice. The COF of the frictional material 230, the magnetic force between the ferromagnetic slug 208 and the permanent magnet 206, and other design choices may affect the disengagement or misalignment force. As an example, the disengagement or misalignment force may be sufficient such that (a) a person cannot, without difficulty, disengage or move the electronic portable device until a battery is fully charged, (b) lightly nudging the electronic portable device is insufficient to disengage or misalign the electronic portable device, or (c) other external forces are insufficient to disengage or misalign the electronic portable device.

The engagement of the frictional material 230 may result in haptic feedback to the user, further signaling proper alignment between the electronic portable device and the inductive power supply. In response to breaking the engagement between the ferromagnetic slug 208 and the permanent magnet 206, the frictional material 230 returns to its normal state—the retracted position. In alternative embodiments, frictional material 230 may be located in the inductive power supply, and may engage a surface of the portable electronic device in a similar manner.

As another example of the fifth embodiment, illustrated in FIG. 14, the frictional material 230 and a ferromagnetic slug 208, which is disposed near the frictional material 230, are located in the inductive power supply. Further, the frictional material 230 is located near the center of the primary coil 212 of the inductive power supply. In this example, the frictional material 230 remains in an engaged position as its normal state. Using the DC coil system described previously, the DC current 273 through the primary coil 212 results in magnetic force 274. This magnetic force 274 in turn attracts the ferromagnetic slug 208 and therefore retracts the frictional material 230. While the frictional material 230 is retracted, the electronic portable device may freely move on the surface of the inductive power supply. Further, the magnetic force 274 also may urge the electronic portable device toward proper alignment with the inductive power supply, as mentioned above.

In response to the inductive power supply sensing alignment between itself and the electronic portable device, it may turn off the DC current 273, releasing the ferromagnetic slug 208 such that the spring causes the frictional material 230 to engage the surface of the electronic portable device. In this way, as the user slides the electronic portable device across the surface of the inductive power supply, the frictional material 230 engages the electronic portable device, in response to sensing proper alignment, so that the electronic portable device no longer freely moves over the surface of the inductive charger. Put differently, in response to achieving proper alignment between the inductive power supply and the electronic portable device, the DC current 273 may be replaced with an AC current supplied to the primary coil 212, resulting in the frictional material 230 returning to its normal state—engaged—such that the electronic portable device remains held in place while receiving inductive power. Further, the engagement of the frictional material, in some embodiments, may provide haptic feedback to the user in response to proper alignment.

The inductive power supply may also perform a realignment function in response to misalignment or disengagement of the electronic portable device and the inductive power supply. In response to misalignment, the inductive power supply may apply DC current 273 to the primary coil 212, retracting the frictional material 230 in order to reduce friction between the electronic portable device and the inductive power supply, and resulting in an attractive force urging the electronic portable device toward alignment. In response to sensing realignment, the inductive power supply may apply an AC current to the primary coil 212, as discussed previously, such that the frictional material 230 is engaged, and for transferring inductive power to the electronic portable device.

The above descriptions are those of current embodiments of the present invention. Various alterations and changes may be made without departing from the spirit and broader aspects of the invention as defined in the appended claims, which are to be interpreted in accordance with the principles of patent law including the doctrine of equivalents. Any reference to claim elements in the singular, for example, using the articles "a," "an," "the" or "said," is not to be construed as limiting the element to the singular.

The embodiments of the invention in which an exclusive property or privilege is claimed are defined as follows:

1. An inductive power supply with magnetic attraction, said inductive power supply for transferring power wirelessly to a remote device, said inductive power supply comprising:
   a primary capable of transferring power wirelessly via an inductive coupling;
   a controller for controlling a supply of current to said primary, wherein said current includes direct current and alternating current;

wherein in response to supplying said alternating current to said primary, said primary transfers power wirelessly to said remote device;

wherein in response to supplying said direct current to said primary, an attractive force capable of aligning said remote device for more efficient wireless power transfer is produced; and a frictional material coupled to a first magnet, wherein said direct current supplied to said primary attracts said first magnet and causes said frictional material to retract such that said frictional material is prevented from contacting a surface of the remote device.

2. The inductive power supply of claim 1 wherein said direct current supplied to said primary generates a DC magnetic field that interacts with a secondary magnetic material in said remote device.

3. The inductive power supply of claim 2 wherein said DC magnetic field has a first magnetic moment and said secondary magnet has a secondary magnetic moment, where said first magnetic moment is aligned in a same direction as said secondary magnetic moment.

4. The inductive power supply of claim 2 wherein said secondary magnetic material is a secondary permanent magnet or a secondary magnetic attractor.

5. A method for aligning an inductive power supply with an electronic portable device using magnetic attraction comprising the steps of:

supplying DC current through a first coil;

providing a DC magnetic field that interacts with the DC current through the first coil;

retracting, in response to the DC current through the first coil, a frictional material coupled to a first magnet such that the frictional material is prevented from contacting an opposing surface; and aligning the inductive power supply with the electronic portable device for efficient power transfer using the attractive force caused by the interaction of the DC current and the DC magnetic field.

6. The method of claim 5 wherein the DC magnetic field is produced from the inductive power supply and the first coil is a secondary inductor in the electronic portable device, and wherein the opposing surface is a surface of the inductive power supply.

7. The method of claim 5 wherein the DC magnetic field is produced from the electronic portable device and the first coil is a primary inductor in the inductive power supply, and wherein the opposing surface is a surface of the electronic portable device.

8. The method of claim 5 wherein the DC magnetic field is generated by at least one of a magnet and supplying DC current through a second coil.

9. A wireless power supply with magnetic attraction comprising:

an inductive power supply having a primary inductor for transferring power wirelessly to an electronic device having a secondary inductor that receives power from said primary inductor via inductive coupling;

a first DC magnetic field generated by a DC current through a first coil;

a second DC magnetic field, wherein said second DC magnetic field interacts with said DC current through said first coil to cause alignment of said inductive power supply with said electronic device for efficient power transfer; and a frictional material coupled to a first magnet, wherein said DC current supplied to said first coil attracts said first magnet and causes said frictional material to retract such that said frictional material is prevented from contacting an opposing surface.

10. The wireless power supply of claim 9 wherein said first coil is said primary inductor and said first DC magnetic field originates from said inductive power supply, and wherein said opposing surface is a surface of the electronic device.

11. The wireless power supply of claim 9 wherein said first coil is said secondary inductor and said first DC magnetic field originates from said electronic device, and wherein said opposing surface is a surface of the inductive power supply.

12. The wireless power supply of claim 9 wherein said second DC magnetic field is generated by at least one of a magnet and a DC current supplied to a second coil.

13. The wireless power supply of claim 12 wherein said magnet is a permanent magnet or a magnetic attractor.

14. The wireless power supply of claim 9 wherein said first DC magnetic field is supplemented with a magnet.

15. The wireless power supply of claim 9 further comprising a plurality of primary inductors forming an array.

16. The wireless power supply of claim 15 wherein said DC current is supplied to at least one of said plurality of primary inductors to cause alignment of said inductive power supply with said electronic device for efficient power transfer.

17. A friction enhancement system for a wireless power system, said wireless power system including a wireless power supply and a portable electronic device capable of receiving wireless power, said wireless power supply having a surface for placing said portable electronic device, said friction enhancement system comprising:

a frictional material selectively moveable between a disengaged position where said portable electronic device is capable of sliding over said surface and an engaged position where said frictional material increases friction between said wireless power supply and said portable electronic device thereby reducing said capability to slide said portable electronic device over said surface; and a magnet coupled to said frictional material, wherein in a presence of a DC magnetic field, said magnet moves said frictional material from a normal state to an alternate state.

18. The friction enhancement system of claim 17 further comprising a dual-use inductive element for use in wireless power transfer and friction enhancement, wherein an AC current through said dual-use inductive element generates wireless power transfer between said wireless power supply and said portable electronic device;

wherein a DC current through said dual-use inductive element produces said DC magnetic field, wherein said normal state is said engaged position, and wherein said magnet moves said frictional material to said disengaged position as said alternate state such that said surface is free from said frictional material.

19. The friction enhancement system of claim 17 wherein said normal state is said disengaged position, and wherein in said presence of said DC magnetic field, said magnet moves said frictional material to an engaged position as said alternate state.

20. The friction enhancement system of claim 17 further comprising a cavity for use with said disengaged position such that said frictional material enters a retracted position.

21. The friction enhancement system of claim 17 wherein said DC magnetic field is produced by a permanent magnet.

22. The friction enhancement system of claim 17 further comprising a spring-like element that exerts a force on said frictional material such that said frictional material is urged toward said normal state, wherein said frictional material remains in said normal state in absence of said DC magnetic field.

23. The friction enhancement system of claim 17 wherein said magnet is a permanent magnet or a magnetic attractor.

24. The friction enhancement system of claim 17 wherein said frictional material moving to an engaged position provides haptic feedback to a user.

25. The friction enhancement system of claim 17 wherein said surface has a coefficient of friction with respect to said portable electronic device and said coefficient of friction of said surface increases in response to said frictional material moving to said engaged position.

* * * * *